Patented Apr. 6, 1937

2,076,201

UNITED STATES PATENT OFFICE 2,076,201

PROCESS FOR THE POLYMERIZATION OF UNSATURATED HYDROCARBONS

Siegfried Leonard Langedijk and Adrianus Johannes van Peski, Amsterdam, Netherlands, assignors by mesne assignments, to Shell Development Company, San Francisco, Calif., a corporation of Delaware No Drawing. Original application April 7, 1931, Serial No. 528,454. Divided and this application June 19, 1935, Serial No. 27,374. In Great Britain April 29, 1930

7 Claims. (Cl. 196—10)

This application is a division of application Serial No. 528,454, filed April 7, 1931.

Our invention relates to the manufacture of hydrocarbons of higher molecular weight from unsaturated hydrocarbons of lower molecular weight, in particular of the olefine series.

It is well known that unsaturated hydrocarbons such as olefines may be polymerized by a heat treatment whether or not under pressure and, if desired, in the presence of suitable catalysts.

As catalysts various inorganic halides have already been proposed and different halides are known to be capable of promoting the polymerization. Thus it is known, for instance, to polymerize olefines in the presence of aluminium chloride which is dispersed in gasoline.

A drawback of these known processes is, in general, that the nature of the polymerization products cannot be sufficiently controlled. The substances obtained after the treatment constitute a mixture of higher and lower polymerization products, the nature of which differs considerably.

It has now been ascertained that the polymerization can be controlled at will with the result that either the nature of the polymerization products can be determined beforehand or the yield can be favourably influenced or both of said beneficial effects can be obtained.

Accordingly, our invention consists in a process for the polymerization of unsaturated hydrocarbons, in particular of the olefine series, by treating the said hydrocarbons in the presence of catalysts, under normal or increased pressure, characterized in that the polymerization is effected in the presence of catalysts obtained by treating inorganic halides, especially those of the elements with a valency of three or more, with substances which influence the polymerization action of the said halides and which under the conditions of the reaction do not combine, or only combine to a negligible extent with the unsaturated hydrocarbons according to the Friedel and Crafts reaction.

According to one embodiment of the invention the inorganic halides are treated with suitable organic compounds or organic solvents for said inorganic halides.

According to another embodiment of the invention the inorganic halides are treated with suitable inorganic compounds such as metal halides which are able to combine with the inorganic halides, if necessary in the presence of organic solvents for said inorganic compounds.

By combining an inorganic halide with a suitable organic compound or by dissolving it in a suitable organic liquid the polymerization power of the halide is modified in such a way that the polymerization proceeds up to a well defined stage, which is not the case when the halide is applied as such or distributed on inert supports or suspended in different liquids.

It is already known that different inorganic halides have different influences on the polymerization of unsaturated hydrocarbons. It will be understood that according to the invention it is possible to modify the polymerization power of one and the same halide by combining it with different organic compounds or by dissolving it in different organic liquids, so as to obtain the desired progress of polymerization and in consequence thereof polymerization products of the desired nature.

It is known that various aromatic hydrocarbons such as benzene may combine with olefines under the influence of aluminum chloride, which reaction is known as that of Friedel and Crafts. No claim is made herein to such reactions, but only those organic compounds or liquids which under the circumstances of the reaction do not combine or only to a negligible extent, with the unsaturated hydrocarbons according to the reaction of Friedel and Crafts are employed.

The compounds of the inorganic halides and organic compounds may be employed as such, i. e. in the liquid or solid state, or they may be used dissolved or dispersed in suitable liquids.

As suitable halides those of aluminum, boron, iron, tin, antimony, bismuth, arsenic, molybdenum, tungsten, vanadium, titanium, thorium and zirconium may be mentioned. Also mixtures of these compounds may be used. As organic compounds or liquids which are to be combined with the halides or in which the halides are to be dissolved may be mentioned nitrobenzene, nitromethane, acetone, acetophenone, benzophenone, benzoyl chloride and diphenyl-sulphone or mixtures thereof. The compound formed may be soluble or insoluble in the liquid organic compound. In the first case the solution may be used or the compound may be more or less isolated, for instance by extracting wholly or in part the excess of organic liquid with a suitable extracting agent, and may be used as such or dissolved or dispersed in another suitable liquid.

Thus the solution of the compound of aluminum chloride and nitrobenzene in nitrobenzene may be extracted with gasoline so as to remove wholly or partially the excess of nitrobenzene, or at any rate most of the free nitrobenzene is removed and a liquid is obtained which is very suitable for effecting the polymerization.

A solid substance may be obtained when mixing the halides with the organic liquids, and this also may be used as such or dissolved or dispersed in a suitable liquid. An example of such a solid substance is the compound between aluminum chloride and diphenyl-sulphone.

The polymerization may be effected at room temperature or at a higher or lower temperature and it may be advantageous to carry out the reaction under pressure. As the polymerization reaction is exothermic, it is sometimes advantageous to control the reaction temperature by applying external cooling.

It was found that the precise conditions for a smooth polymerization treatment, depending on the product desired to be obtained and the olefine or mixture of olefines started from, always have to be predetermined. Thus, for instance, if a polymerization product with very good lubricating properties is required, very good results are obtained with isobutylene when working at a temperature ranging between about −10° and about +10° C. With propylene the range of temperature is higher, if the same final product is required.

Generally speaking care should be taken that an intimate contact is effected between the olefines and the catalytic mass. In many cases the polymerization products form a separate liquid layer in the reaction medium, and they may be recovered by decantation or in any other suitable way. Occasionally the polymerization products are wholly or partly soluble in the organic liquid, so that said products may be obtained in some other way, e. g. by distillation of the reaction mass.

Nitromethane, inter alia, has the advantage that it does not dissolve the polymerization products. Neither does the liquid, consisting of the compound of aluminum chloride and nitrobenzene and from which free nitrobenzene has been removed. In addition to its catalytic action, aluminum chloride has the advantage that it decreases the miscibility of the polymerization products in the organic liquids.

As mentioned above, the nature of the inorganic halide and in addition the nature of the organic compound have an important influence on the nature of the polymerization products. Thus, for instance, when treating isobutylene with aluminum chloride and nitromethane, a higher and more viscous polymerization product is obtained than when the treatment is carried out with the aid of aluminum chloride and nitrobenzene.

The process described above may also be applied to mixtures of two or more olefines or gases, vapours or liquids containing unsaturated hydrocarbons which are capable of being polymerized. Thus the invention may be applied with advantage to motor spirit or the like hydrocarbon liquids, which contain certain undesirable resin- or gum-forming substances of unsaturated character. By treating such a liquid according to the method of this invention said substances are not removed but polymerized and thereby converted into innocuous and even very valuable products, so that a refined motor spirit or the like hydrocarbon liquid is obtained.

Furthermore, the process according to the invention may be applied in order to separate one or more olefines from a mixture of two or more olefines. Such a separation is feasible in view of the fact that under the same reaction conditions several of the above-mentioned solutions or suspensions do not polymerize all the olefines to the same extent. For instance, ethylene at room temperature is not polymerized by a solution of aluminum chloride in nitrobenzene, whereas propylene is polymerized energetically. Thus by passing a mixture of ethylene and propylene through such a solution the ethylene passes unchanged and may be isolated separately.

The following examples serve to illustrate the invention.

1. 25 grams of sublimed aluminum chloride are dissolved in 100 cc. of nitrobenzene and 14.6 litres of propylene at room temperature are passed through said solution at a velocity of 4 litres per hour. During the reaction a considerable amount of heat is developed. 11.1 litres of the propylene are fixed in the solution while an upper layer of polymerization products, substantially containing no aluminum chloride, separates out. The polymerizate has an initial boiling point of 80° C.; 90% of it distills between 80° and 200° C.

2. Isobutylene at room temperature is passed through a solution prepared as described in the preceding example. Under heat-development the butylene is polymerized. From 50 litres of isobutylene, which are passed through the solution at an initial velocity of 4 litres per hour, which is increased during the treatment, 43.5 litres are fixed. The polymerization products, which form an upper layer on the reaction liquid, are subjected to fractional distillation.

The low boiling fractions obtained are:

| ° C. | Cc. |
|---|---|
| From 60–120 | 4 |
| From 120–150 | 3 |
| From 150–170 | 3 |
| From 170–190 | 6 |

They may be used as gasoline fractions with good anti-knock properties.

3. 10 grams of aluminum chloride, 10 grams of diphenyl-sulphone and 100 grams of benzene are mixed together. The mixture constitutes a solution, through which at room temperature 16.5 litres of isobutylene are passed at a velocity of 4 litres per hour. 13.5 litres of isobutylene are fixed and two layers are formed, the upper layer of which consists of polymerization products. On distillation of the upper layer three fractions are obtained, viz:

10% boiling between 100° and 160° C., consisting for the greatest part of di-isobutylene;

15% boiling between 160° and 200° C., mainly consisting of tri-isobutylene;

65% boiling above 200° C. (higher polymerization products).

4. A solution of 20 grams of anhydrous aluminum chloride is brought in a flask on to 50 cc. of nitromethane. While by cooling with ice, the temperature is kept closely above 0° C., 108 litres of isobutylene gas obtained by slowly vaporizing 450 cc. of liquid isobutylene are introduced into the flask, where it polymerizes to a very viscous oil. This oil is isolated and treated with steam at 200° C., about 30 grams of lower polymerized product being thus removed. The residue from the steam distillation weighs 235 grams and consists of a light yellow, very viscous oil, which at 15° C. had a specific gravity of 0.88 and on being distilled in vacuo under a pressure of 0.5 mm. at 280° C. yielded 62% of residue.

5. A solution of 250 grams of anhydrous aluminum chloride in 720 grams of nitrobenzol is placed in a metal tube filled to the top with Raschig rings. Subsequently propylene is forced under pressure into the tube and while the temperature in the reaction tube rises to about 50° C., the pressure is maintained during 15 hours at 10 to 12 atm. by continuously forcing in propylene under pressure. The gas supply is then stopped and the non-polymerized gas released. The liquid polymerization product and catalyst are subsequently removed from the reaction tube and separated from each other in a separating funnel. The layer of $AlCl_3$+nitrobenzol may then again be utilized for the next polymerization; the layer of polymerization product after being shaken with dilute lye, dilute sulphuric acid and water, weighs 300 g. By means of steam at 100° C. 99 grams consisting substantially of low polymerization product and nitrobenzol, are distilled over; then 81 grams of polymerization product are distilled off with superheated steam at 200° C. The residue (about 120 grams) is a light brown, very viscous oil with very favourable properties as a cylinder oil.

6. Isobutylene was passed at 15° C. into a solution of 10 grams stannic bromide in 90 grams of nitrobenzol, at a velocity of 5 litres per hour. Of the 46.5 litres of gas introduced, 41 litres are polymerized to a little more than 90 grams of liquid hydrocarbons. Treatment with steam of 100° C. followed by a steam distillation at 200° C., yields 3 fractions, the first of which could be split up, by fractionating, into a benzene and nitrobenzol, whilst the residue which did not volatilize with steam formed a yellowish brown, viscous oil with good properties as a lubricating oil.

7. Isobutylene is passed over the compound AgCl, $AlCl_3$ contained in a tube heated at 120° C. at a velocity of 40 litres per hour. An efficient condenser in which the liquid products formed are condensed, is connected to the tube. When 76 litres of gas have been passed through the tube, the temperature having meanwhile risen to 150° C., the passage of the gas is discontinued and the liquid polymerization product is neutralized and fractionated.

After the expulsion of a small quantity of isobutylene from the liquid the following fractions are obtained.

| ° C. | Cc. |
|---|---|
| 25–95 | 10.3 |
| 95–110 | 3.0 |
| 110–170 | 21.0 |
| 170–200 | 9.2 |
| 200–270 | 23.0 (yellow oil with blue fluorescence) |
| Above 270 | 32.0 |

8. A tube is filled with pumice stone upon which is brought 20% of the compound CuCl, $AlCl_3$. At a temperature of 120° C. 14.8 litres of isobutylene is passed over the catalyst with a velocity of 10 litres per hour; the reaction products being condensed in a condenser through which ice-water is passing. 17 cc. of a liquid condensate are obtained, which on being fractionated yields:

| | Cc. |
|---|---|
| Isobutylene (to 40° C.) | 4 |
| Benzene fractions from 40–100° C. | 4 |
| Benzene fractions from 100–170° C. | 4 |
| Hydrocarbons boiling above 170° C. | 5 |

9. A tube is filled with pumice stone, upon which 30% of the compound $NaAlCl_4$ (melting point 148° C.) is distributed. After heating up to 150° C. the mass is cooled to 120° C, whereby the compound remains as a supercooled liquid; isobutylene is then passed over it at a velocity of 4 litres per hour. From 55.5 litres of isobutylene 67 cc. of liquid products condensable in a cooler are obtained. Upon being distilled these yield the following results:

| | ° C. |
|---|---|
| Initial boiling point | 25 |
| 10 cc. up to | 77 |
| 20 cc. up to | 106 |
| 30 cc. up to | 137 |
| 40 cc. up to | 169 |
| 50 cc. up to | 226 |
| 54 cc. up to | 255 |
| 10 cc. residue boiling above | 255 |

Loss 2 cc. (partly dissolved isobutylene)

10. 20 grams of $AlCl_3$ are dissolved in 50 cc. of nitrobenzol, 8 grams of NaCl are then added, which dissolves with the evolution of heat (NaCl is insoluble in nitrobenzol alone). In 10 hours 70 litres of gaseous isobutylene—of which 60 litres (about 135 grams) are polymerized—are passed into the liquid which by external cooling is kept at a temperature of 0° C. The reaction mass is then poured on to ice, washed free of acid and treated with steam at 100° C. 50 cc. of steam distillate are thus obtained, which consists substantially of nitrobenzol. By subsequent treatment with superheated steam of 200° C. 20 cc. of polymerization product is distilled over. The residue (a little more than 70 cc.) is a light-yellow, very viscous oil, having the properties of a very good commercial cylinder oil.

We claim as our invention:

1. A process for the polymerization of normally gaseous olefinic hydrocarbons, which comprises subjecting said hydrocarbons to polymerization in the presence of a complex catalyst resulting from combining in molecularly equivalent proportions an active metal halide of an amphoteric metal with at least one inorganic halide of a metal chosen from group one of the Periodic Table which under the conditions of the polymerization reaction is incapable of promoting to any substantial extent polymerization of the hydrocarbons, said complex catalyst having a smaller polymerization action than the metal halide itself.

2. A process for the polymerization of normally fluid polymerizable unsaturated hydrocarbons, which comprises subjecting said hydrocarbons at a temperature not substantially above 120° C. to a treatment at a polymerization temperature with a complex catalyst resulting from combining in molecular equivalent proportions an active metal halide of an amphoteric metal with a halide of a metal chosen from group one of the periodic system of elements, said complex catalyst having a smaller polymerization action then the active metal halide itself.

3. A process for the refining of hydrocarbon oils which comprises subjecting such hydrocarbons while in heated vaporous condition to the action of a double salt of aluminum chloride and a chloride of another metal in molecularly equivalent proportions.

4. A process for the refining of hydrocarbon oils while in heated vaporous condition which comprises subjecting the hydrocarbons to reaction with a molten salt mixture containing aluminum chloride and a chloride of another metal in molecularly equivalent proportions.

5. A process for refining hydrocarbon oil which comprises subjecting the oil to the action of a double salt of aluminum chloride and a chloride of another metal in molecularly equivalent proportions.

6. A process for refining hydrocarbon oil, which comprises subjecting the oil to the action of a molten salt mixture containing aluminum chloride and a chloride of another metal in molecularly equivalent proportions.

7. In the process for the polymerization of normally fluid polymerizable unsaturated hydrocarbons the step of subjecting said hydrocarbons at a temperature not substantially above 120° C. to the catalytic polymerizing action of a double salt of an active inorganic halide of an amphoteric metal and another inorganic halide of a non-amphoteric metal in molecularly equivalent proportions.

SIEGFRIED LEONARD LANGEDIJK.
ANDRIANUS JOHANNES van PESKI.